May 29, 1962  H. B. CHATFIELD  3,036,318
METHOD OF AND APPARATUS FOR MAKING METAL WASHERS
Filed Oct. 31, 1960  3 Sheets-Sheet 1

INVENTOR
*Henry B. Chatfield*

BY *McCoy, Greene & te Grotenhuis*
ATTORNEYS

May 29, 1962     H. B. CHATFIELD     3,036,318
METHOD OF AND APPARATUS FOR MAKING METAL WASHERS
Filed Oct. 31, 1960     3 Sheets-Sheet 3

INVENTOR
Henry B. Chatfield
BY McCoy, Greene & Te Grotenhuis
ATTORNEYS

United States Patent Office 3,036,318
Patented May 29, 1962

3,036,318
METHOD OF AND APPARATUS FOR MAKING METAL WASHERS
Henry B. Chatfield, Santa Ana, Calif., assignor to Textron, Inc., Providence, R.I., a corporation of Rhode Island
Filed Oct. 31, 1960, Ser. No. 66,262
20 Claims. (Cl. 10—72)

The present invention relates to a high speed economical method of and apparatus for cold forming washers and similar articles from copper, brass, bronze, and other ductile relatively soft metals without scrap loss and more particularly to a method of and apparatus for forming washers or the like by upsetting the end of a cylindrical wire or rod to form an annular head and then shearing the head from the wire or rod by axial force against an internally cylindrical die member surrounding the wire.

The method of this invention is very advantageous since it permits extremely high speed manufacture without waste due to scrap losses, but the method is difficult to perform because of the extremely high forces required to cause flow of the metal and the tendency of the articles to be damaged if there are stress concentration points produced by scratches or rough surfaces on the wire. The long metal wire or rod should be gripped so as to withstand axial forces of more than 5 tons and usually more than 10 tons. I have found that the process cannot be performed if the wire is gripped by segmental gripping means which engage the wire since the external surface of the wire is damaged by such gripping means. I have discovered, however, that the method can be performed efficiently for millions of cycles by employing a hard elastic tube of tool steel or the like having a length many times its diameter and having a smooth cylindrical internal surface with a diameter not substantially greater than that of the wire but sufficient to permit feeding of the wire through the tube.

Such a gripper tube may be shrunk by a radial pressure in excess of 10,000 pounds per square inch an amount in excess of one-half percent or more without exceeding its elastic limit to grip the wire and prevent axial movement thereof when the wire is subjected to the many tons of axial force necessary to cause radial outward flow of the metal into the die cavity during the upsetting operation. The shrinking of the gripper tube eliminates irregularities in the external surface of the wire and reduces the external diameter of the wire so that it has the proper size as it enters the die. The gripper tube may be shrunk by wedge-shaped segmental gripping means which apply a substantially uniform pressure to the tube throughout the circumference thereof.

The gripping means of this invention preferably comprises a series of gripper segments which engage a generally cylindrical tapered surface of a gripper case and which are moved radially inwardly by a wedging action when the gripper case is moved axially. The forces necessary to move the gripper case are extremely high (i.e., 20 to 30 tons or more) due to the large amount of friction and the extremely high radial pressures (i.e., more than 10,000 p.s.i.) which must be generated.

The method of the present invention comprises, in seriatim, the steps of passing a copper wire or other suitable wire which is dry and free of lubricants through a cylindrical gripper tube of hard steel or the like to a die cavity having the shape of the finished washer or other desired article so that the end of the wire projects a short distance into the cavity, applying an extremely high radial pressure to the exterior of the gripper tube to shrink the same and to grip the wire while reducing the diameter of the wire and providing the wire with a smooth cylindrical external surface, applying an axial upsetting force to the end of the wire (i.e., 10 to 20 tons) sufficient to cause radial outward flow of the metal into the die cavity to form an annular head, cold forming or coining the head by applying axial pressure thereto so that it conforms to the exact shape of the die cavity, releasing the radial pressure on the gripper tube to release the wire, shearing the head in the die cavity from the wire by axial pressure against the die member surrounding the wire, and extracting the finished washer or article from the die cavity. Such process can be performed at extremely high speeds without scrap loss, and millions of cycles can be performed before the gripper tube is replaced when the tube is made of tool steel or other suitable hard elastic material.

The washers produced by the method of this invention have a high quality and may be formed to very close tolerances. The washers do not crack or split during the forming operation due to the fact that the wire entering the die cavity has a very smooth external cylindrical surface as provided by the gripper tube and the die tube even though the wire fed into the machine is a relatively inexpensive type and does not have an extremely accurate surface finish. The gripper tube has been found to be absolutely essential for forming such articles since an extremely smooth cylindrical surface is required on the wire entering the die cavity. Without such tube the process would be impractical.

An object of the present invention is to provide a practical economical process of forming washers or the like from long metal wires.

A further object of the invention is to provide a simple and economical method of and apparatus for gripping a wire which does not damage the external surface thereof and which holds the wire against movement when it is subjected to axial forces of many tons.

Another object of the invention is to provide apparatus for gripping a metal wire which provides the wire with an accurate, smooth, cylindrical external surface while holding the wire so that it does not move when the end portion thereof is deformed by axial force and which may be operated for an extremely large number of cycles without replacement of parts.

A still further object of the invention is to provide an inexpensive, durable, high speed apparatus for forming metal washers of high quality from copper, brass, bronze or similar ductile metal wires without scrap loss.

Other objects, uses and advantages of the invention will become apparent to those skilled in the art from the following description and claims and from the drawings in which:

Referring more particularly to the drawings, in which like parts are identified by the same numerals throughout the several views, FIGS. 1 to 4 show a machine for performing the method of this invention with parts thereof shown schematically. As shown, the machine has a rigid metal frame including a pair of aligned horizontal channels 1 and 2 and a pair of longitudinally elongated guide blocks 3 and 4 rigidly mounted on said channels. Each of the guide blocks has an enlarged shaft supporting end portion 5 for rotatably supporting the cam shaft 8 and for receiving a clamping member 6 which is held in place by hex head cap screws 7. The upright end portions 9 and 10 of the frame support the channels 1 and 2 in a horizontal position.

It will be understood that the machine shown herein has been simplified and shown schematically to facilitate a ready understanding of the invention and that different and heavier constructions can be employed with various other types of actuating mechanisms to perform the method of this invention.

Figure 1:
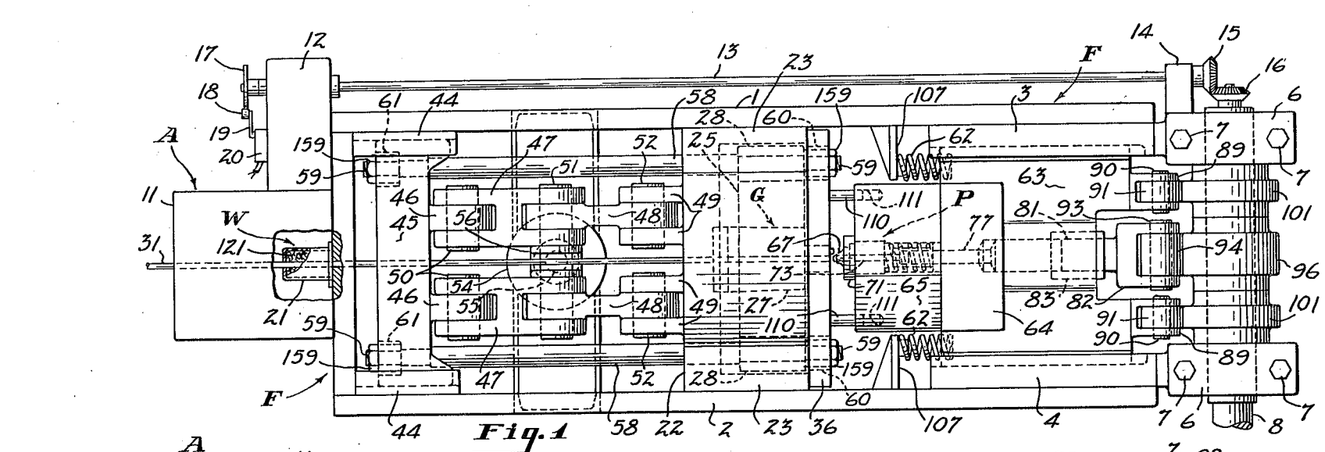
FIGURE 1 is a a schematic top plan view on a reduced scale with parts broken away and shown in section showing a machine according to the present invention for making copper spark plug washers from a copper wire.
Figure 2:
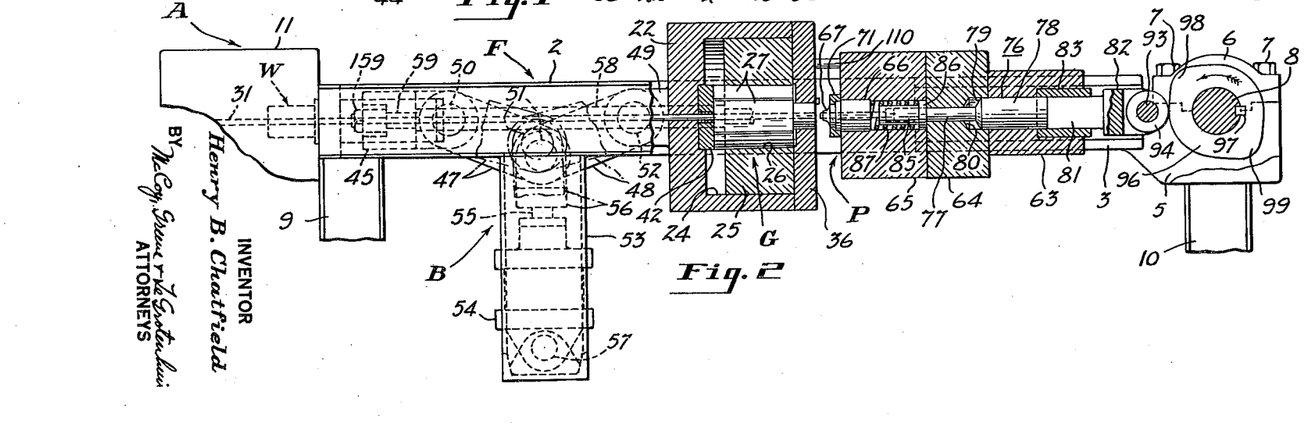
FIGURE 2 is a fragmentary side elevational view of the machine of FIG. 1 on the same scale with parts broken away and shown in section, the parts being shown in solid lines in their positions when the wire has been released by the gripping means, parts of the gripper actuating means being shown in dot-dash lines in their uppermost positions.

A wire feeding mechanism A is driven by the cam shaft 8 and is shown schematically in FIGS. 1 and 2. This mechanism is enclosed in a housing 11 carried by the frame F and periodically feeds the wire at the beginning of each cycle. A smaller housing 12 is carried at the side of the frame and rotatably supports a longitudinal shaft 13, the other end of the shaft being journaled in a support 14 carried by the frame F. A bevel gear 15 mounted on one end of the shaft 13 meshes with a bevel gear 16 mounted on the end of the transverse motor-driven cam shaft 8 to drive the feeding means A and also a timing wheel 17. The timing wheel 17 is mounted on the other end of the shaft 13 and has an actuator 18 thereon which periodically engages the lever 19 of the electric switch 20 to effect gripping and releasing of the wire in timed relation to rotation of the cam shaft 8 and in synchronism with the periodic feed of the wire.

The copper wire 31 fed to the machine of the present invention must be clean and free of oil or other lubricating means. The wire is usually clean and may be worked on while in this condition, but it is preferable to provide means for cleaning the wire before or after it passes through the feeding means A. It is preferred to employ fluid for cleaning the wire rather than wire brushes or other scraping means so as to avoid scratching the surface of the wire. Various cleaning means may be employed as will be apparent to those skilled in the art but it is preferred to employ liquid solvents to remove any oil or grease on the surface of the wire.

As herein shown, the machine of the present invention is provided with cleaning means in the form of a solvent-saturated wiper means W. The wiper means is shown schematically herein as a small annular metal housing 21 rigidly mounted on the frame concentric to the wire 31 and filled with a material 121 which is saturated with a suitable solvent. The solvent saturated material is arranged to wipe the excess solvent from the wire before it leaves the means W so that the wire will dry rapidly without the aid of external heating means.

Figure 3:
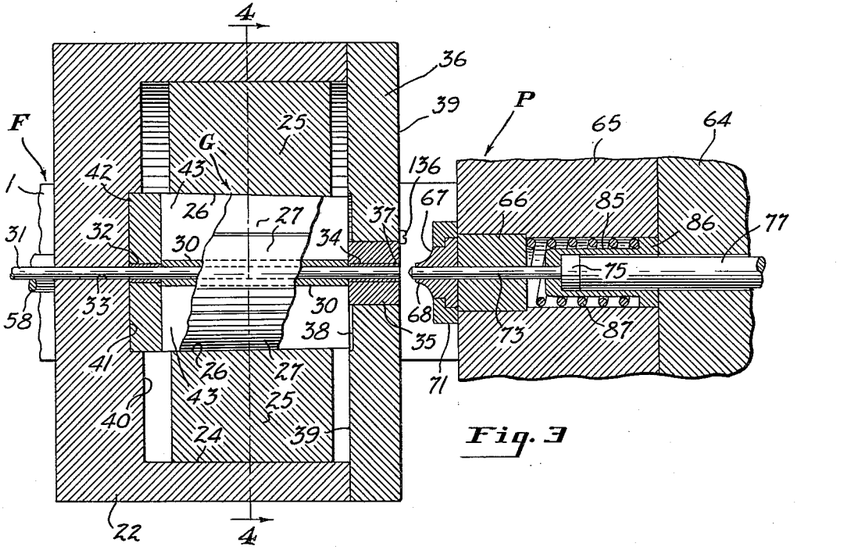
FIGURE 3 is a fragmentary longitudinal sectional view similar to FIG. 2 and on a larger scale with parts broken away showing details of the machine of FIGS. 1 and 2, the parts being shown in their positions at the start of the forming operation after the wire has been gripped.
Figure 4:
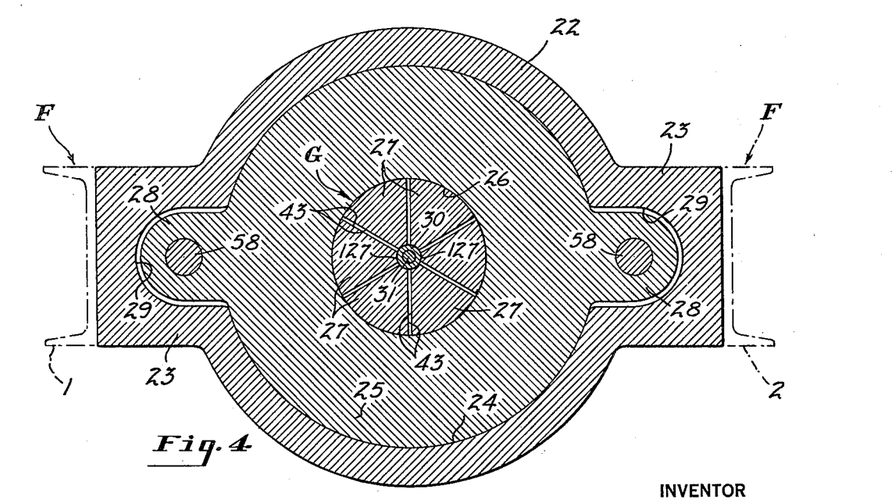
FIGURE 4 is a transverse vertical sectional view taken on the line 4—4 of FIG. 3 and on the same scale the frame being shown in dot-dash lines.

A gripper housing 22 is mounted on the frame F and has radially extending side portions 23 rigidly connected to the channels 1 and 2 as shown in FIGS. 1 and 4. The gripper housing has a smooth internal cylindrical surface 24 with diametrically opposed axial grooves 29 therein. An externally cylindrical annular gripper case 25 is provided which has the same diameter as the surface 24 and slides axially on said surface. The case has a slightly tapered frusto-conical internal surface 26 for engaging the similarly tapered outer surface of the segmented gripping means G and has radially extending side portions 28 which fit in the grooves 29. The gripping means G shown herein comprises six axially elongated segments 27 of the same size having flat radial faces 43 and having tapered outer surfaces of a size to fit accurately against the tapered internal surface 26 as shown in FIGS. 3 and 4.

The tapered surface 26 usually has a uniform taper of 1° to 2° relative to the axis but this may vary considerably in different machines. Such surface should be polished and machined very accurately (i.e., to within 0.02 percent of the desired size). The same is true of the external tapered surface of the segments 27.

A cylindrical gripper insert tube 30 is provided having a uniform radial thickness and a length corresponding substantially to the axial length of the segments 27. The tube surrounds the externally cylindrical copper wire 31 which has a uniform diameter at least equal to the internal diameter of the tube 30. As herein shown, a guide tube 32 is mounted on the wire at one end of the gripper tube 30 in alignment with the center cylindrical bore 33 of the gripper housing 22, and a die tube 34 is mounted on the wire at the opposite end of the tube 30 as best shown in FIG. 3. The tubes 30, 32 and 34 are preferably circumferentially continuous, but the tubes 32 and 34 are usually of less axial length and may be split circumferentially without substantially affecting the operation. It will be understood, that the radial thicknesses of these tubes need not be the same. The radial thickness of the tube 34 should, however, be equal to the desired radial thickness of the washer. The tube 30 may have an internal diameter slightly less than the outside diameter of the wire 31 and may be chamfered at its inlet end to facilitate entry of the wire.

The segmental gripping means G is preferably constructed so that when full gripping pressure is applied, all of the flat radial faces 43 of the segments 27 are parallel and spaced apart a very small amount (i.e., less than one-tenth the external diameter of the gripper tube). The segments 27 may be shaped to engage more than 80 percent of the external surface of the gripper tube. The radially inner surfaces 127 of the segments preferably have substantially the same radius of curvature as the external surface of the relaxed tube 30 and provide the closed gripping means G with a cylindrical internal surface. The radius of curvature of the surface 127 of each segment should vary no more than about one-tenth percent throughout the length of the segment.

The cylindrical die tube 34 is mounted in a cylindrical bore of an externally cylindrical hardened metal die block 35 which fits in a stationary internally cylindrical vertical die holding plate 36 and is mounted for slight axial movement therein. The axial thickness of the block 35 is greater than the axial length of the die tube 34 to provide an annular die cavity 37 of substantially square cross section. A press fit or the like may be provided to hold the die tube in place.

A circular recess 38 of uniform depth concentric to the tube 30 and the surface 24 may be provided in the flat vertical face 39 of the die holding plate. This recess has a diameter a fraction of an inch greater than that of the released gripping means G and serves to center the segments and also to provide clearance.

The flat vertical face 40 of the housing 22 has a circular recess 41 of a size to receive a flat cylindrical hardended backup block or anvil 42 which is held concentric to the tube 30 and the surface 26 and which has the same axial dimension as the guide tube 32, the internal diameter of said block being equal to the external diameter of said guide tube.

Gripper actuating means B are provided for moving the gripper case 25 axially to effect gripping and releasing of the copper wire 31 in timed relation to rotation of the camshaft 8, the uppermist positions of the parts being shown in dot-dash lines in FIG. 2. Various means may be employed to obtain the extremely high forces required as will be apparent to those skilled in the art. The apparatus shown schematically herein includes a pair of side guide blocks 44 rigidly mounted on the channels 1 and 2 and a cross member 45 mounted on said blocks for longitudinal sliding movement while being held against transverse or rotary movement. The cross member has a pair of ears 46 for receiving a pair of bifurcated toggle links 47, and said links are connected by a pair of single toggle links 48 to a pair of double ears 49 that is rigidly mounted on the gripper housing 22. Cylindrical pins 50 and 51 pivotally connect the links 47 of the toggle mechanism to the ears 46 and to the links 48, respectively, and cylindrical pins 52 pivotally connect the links 48 to the bifurcated ears 49.

The vertical standard 53 of the frame F provides a support for a hydraulic fluid motor or ram 54 having a piston 55 pivotally connected to the central pin 51 by a yoke 56. The lower end of the motor 54 is pivotally mounted on a cylindrical pin 57 mounted on the frame. The force exerted by the motor is multiplied many times by the toggle mechanism to force the cross member 45 away from the gripper housing 22. This force is transmitted by the horizontal connecting rods 58 to the gripper case 25 which is rigidly connected to the cross member 45 by said rods for longitudinal movement in unison therewith. As herein shown, the die holding plate 36 has circular holes 60 to receive the nuts 159 and the cross member 45 has circular recesses 61 to receive the nuts 159, which are screwed on the reduced threaded end portions 59 of the rods 58.

A punch assembly P is provided for upsetting, coining and cutting the washers W. The actuating means for this assembly is shown schematically, it being understood that different and heavier equipment may be employed when it is desired to obtain extremely high forces for the various operations.

The punch assembly includes a punch actuating block 63 having a ram 64 rigidly mounted thereon and a detachable punch case 65 rigidly mounted thereon by set screws or the like. A cylindrical hardened backup block 66 is rigidly mounted in the case 65 coaxial with the wire 31 and the punch annulus 67. Said annulus has an annular projecting sleeve portion 68 at its outer end with a flat vertical annular surface 69 of the same size as the radial cross section of the die cavity 37 for engaging the washer W as it is formed. The radially outwardly extending portion 70 of the punch annulus 67 engages the radially inwardly extending portion 72 of the detachable retaining annulus 71 to prevent movement of the punch annulus. The retaining annulus is rigidly mounted on the punch case 65 by set screws or the like and rigidly holds the annulus 67 in its position.

A cylindrical upset pin 73 is provided in axial alignment with the die tube 34 and has a diameter equal to the internal diameter of said die tube. The wire-engaging nose of said upset pin recedes from its terminus and preferably has a smoth obtuse conical surface 74. An enlarged head 75 is provided at the opposite end of the upset pin.

The upset pin is actuated independently of the punch annulus 67 by means including a driver pin 76 coaxial with the upset pin. The driver pin has a reduced cylindrical portion 77 and an enlarged cylindrical portion 78 spaced therefrom by a frusto-conical surface 79. The ram 64 has an internal frusto-conical surface 80 of the same size as the surface 79 which is spaced axially from the surface 79 to permit axial movement of the driver pin relative to the ram. The driver pin 76 also has a square portion 81 and has a yoke 82 at its outer end. The square portion slides axially in a square guide sleeve 83 rigidly mounted on the block 63.

The cylindrical end portion 77 of the driver pin engages the head 75 of the upset pin within a collet 85 as best shown in FIG. 3. The annular head 86 of the collet engages the helical spring 87 surrounding the collet and is biased toward the ram 64, whereby the collet holds the head 75 against the end of the driver pin.

It will be apparent to those skilled in the art that the block 63 and the driver pin 76 may be actuated in many different ways to perform the method of this invention. As herein shown, the block 63 has a pair of yokes 89 which are connected by cylindrical pins 90 to cylindrical cam rollers 91. In a similar manner, a cylindrical pin 93 connects the yoke 82 of the driver pin to the central cylindrical cam roller 94. A central cam 96 is mounted on the shaft 8 for engaging the cam roller 94 and is keyed to the shaft for rotation in unison therewith by an axially extending key 97. As herein shown, the cam 96 has two lobes 98 and 99 for effecting the desired sequence of operations. The cams 101 are similarly mounted on the camshaft 8 and engage the cam rollers 91 to operate the punch annulus in the manner indicated in FIGS. 5 to 9.

As herein shown, the spring 87 holds the cam roller 94 in contact with the cam 96, and the return springs 62 which bear against the end members 107 of the blocks 3 and 4 hold the cam rollers 91 in contact with the cams 101, but reciprocation of the members 76 and 67 may, of course, be effected in various other ways to perform the method of this invention.

Suitable guide pins and bushings may be provided for guiding the punch case as it moves toward the die block 35 and for holding said case in axial alignment with said block. As herein shown, a plurality of horizontal cylindrical guide pins 110 are rigidly mounted on the die holding plate 36 and extend into cylindrical bores 111 in the punch case which have the same diameter to maintain the die block 35 and the die tube 34 coaxial with the punch case 65, the sleeve 68 and the upset pin 73 as the upset pin is moved against the end of the wire 31.

Figure 10:
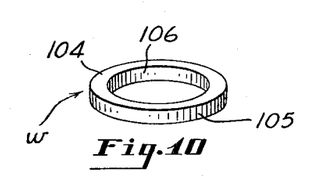
FIGURE 10 is a perspective view of the washer made in the machine of FIGS. 1 to 9.

The feeding means A, the gripping means G, the upset pin 73, the punch annulus 67, and the other parts of the punch assembly P are operated in a predetermined sequence as controlled by the cam shaft 8 and its associated control elements to form small annular spark plug washers W having the same shape as the die cavity 37. As shown in FIG. 10, the washer w has parallel, flat, top and bottom surfaces 104 and concentric outer and inner cylindrical surfaces 105 and 106, respectively, but it will be apparent that the method of this invention may also form various other articles having a generally annular form or having an internal surface corresponding generally to the external surface of the copper wire from which the article is made.

Figure 5:
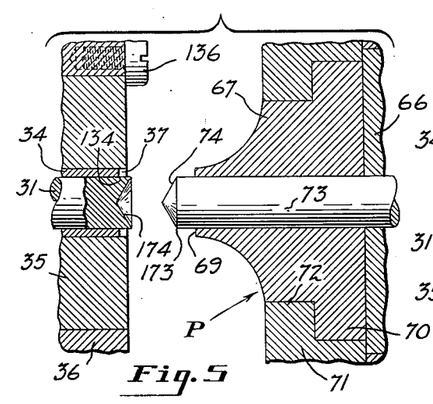
FIGURE 5 is a diagrammatic sectional view with parts broken away and shown in section showing the position of the parts at the beginning of a cycle of operation.

The method of the present invention is illustrated in FIGS. 5 to 9, the machine shown schematically herein being designed to perform this method. The first step of the method is to feed the wire 31, which has previously been cleaned by the solvent wiper W, a short distance beyond the bottom of the die cavity 37 as shown in FIG. 5 so as to provide a volume of metal in the end portion of the wire located beyond the bottom of the die cavity substantially greater than the volume of the finished washer w. When making a washer of the type shown herein, the end of the wire 31 is fed beyond the bottom of the die cavity 37 a distance less than the thickness of the finished washer but the amount of feed will vary according to the shape of the washer that is being made. A substantial force is exerted by the feeding mechanism A to force the wire 31 through the gripper tube 30 since said tube usually has an internal diameter slightly less than the original external diameter of the wire. The internal diameter of the die tube 34 may also be such as to require a substantial force to push the wire through the tube 34.

After the forward feeding of the wire 31 has been completed and the wire is in the position shown in FIG. 5, the actuator 18 of the wheel 17 strikes the lever 19 and throws the switch 20 so as to cause operation of the gripper actuating means B. An axial force of many tons is then exerted on the gripper case 25 causing it to move axially a fraction of an inch toward the end face 40 whereby a radial pressure of several thousand pounds per square inch (i.e., more than 10,000 p.s.i.) is applied by the gripper case 25 to the gripping means G. This shrinks the internal diameter of the gripper tube 30 a few thousandths of an inch within the elastic limit of the material and grips the wire 31 with a sufficient force to prevent axial movement of the dry wire during the upsetting operation which follows.

Figure 6:
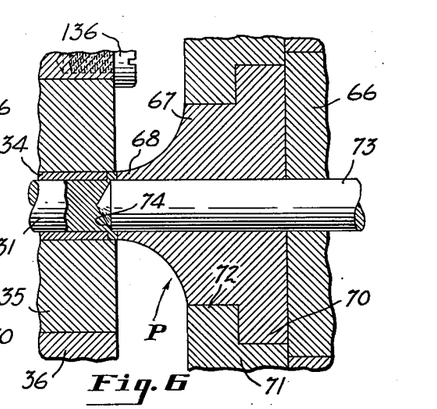
FIGURE 6 is a fragmentary sectional view showing the position of the parts at the end of the initial upsetting operation.

While the wire 31 is so gripped by the means G, the cams 96 and 101 cause the punch assembly P, including the punch annulus 67 and the upset pin 73 to move together toward the conical end surface 174 of the wire 31, which has the same shape as the projecting conical end surface 74 of the upset pin, the pin 73 projecting beyond the face of the punch annulus 67 so as to contact the wire before the punch annulus. The pin 73 contacts the wire first and applies a force of many tons against the wire to upset or flare the end portion of the wire by causing the metal to flow radially outwardly past the sharp circular edge 134 of the die tube 34 into the die cavity 37 so as roughly to fill said cavity, the projecting sleeve portion 68 engaging the metal to cause it to assume the general shape of the cavity as shown in FIG. 6.

Figure 7:
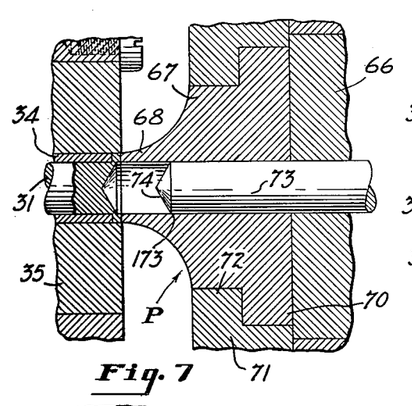
FIGURE 7 is a fragmentary sectional view showing the position of the parts during the coining operation which follows the upsetting operation.

After flaring of the end of the wire, the upset pin 73 is allowed to withdraw by the cam 96 and is moved out of the die cavity by the spring 87. During this retraction of the pin, the wire 31 is held in position by the gripping means G and the punch annulus 67 is caused to continue its forward movement by the cams 101 so as to exert an axial force of several tons against the metal in the die cavity so as to cold coin the metal to the exact shape of the cavity 37 as shown in FIG. 7. The pin 73 may remain in contact with the surface 174 during the cold coining operation, but the pin is preferably retracted during such operation as indicated in FIG. 7.

It will be understood that all the steps of the process of this invention are preferably performed at normal temperatures in the neighborhood of 60° to 80° F. without external heating to soften the metal, particularly when soft ductile metals are worked.

Figure 8:
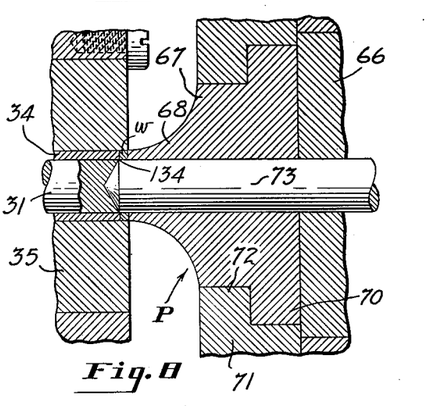
FIGURE 8 is a sectional view showing the position of the parts after the washer has been sheared from the wire.

At the completion of the coining operation, the punch annulus 67 dwells in its bottomed position against the metal filing the die cavity 37 and the switch 20 is thrown by the wheel 17 to energize the actuating means B and to effect operation thereof in the opposite direction to push the gripper case 25 away from the end face 40 to the position shown in FIG. 2 whereby the elastic gripper tube 30 expands and releases its grip on the wire 31. Upon release of the gripping means and during the dwell of the punch annulus as determined by the cams 101, the upset pin 73 is driven forward past the cutting edge 134 of the die tube by the cam 96 with a force of several thousand pounds to shear the material filling the die cavity (i.e., the annular head) from the wire 31 as shown in FIG. 8 and to form a washer $w$ having an inside diameter which is the same as the outside diameter of the upset pin. A hammer action may be provided so that the material is sheared cleanly as the sharp marginal edge 173 of the pin passes the sharp edge 134.

Figure 9:
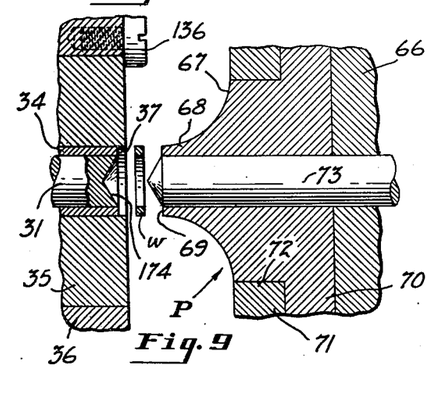
FIGURE 9 is a fragmentary sectional view similar to FIGS. 5 to 8 and on the same scale showing the position of the parts at the end of the forming operation after the washer has been extracted from the die cavity and stripped from the upset pin before the wire is fed to the position in FIG. 5 to complete the cycle of operation.

After the shearing operation is completed the cams 96 and 101 permit retraction of the punch assembly P by the springs 62 and 87 away from the die block 35. During this retraction the finished washer $w$ sticks to the protruding pin 73 as the pin and the punch annulus are retracted to extract the washer from the die cavity 37. The cams 96 and 101 are so shaped that the upset pin 73 overrides the punch annulus 67 whereby the spring 87 retracts the upset pin into the punch annulus and strips and ejects the washer $w$ from the upset pin as indicated in FIG. 9, the washer $w$ falling out of the machine. This completes one cycle of operation.

The next cycle of operation begins as before by operation of the feeding mechanism A which is geared to the cam shaft 8. The wire 31 is then fed forward again by such mechanism into the position shown in FIG. 5 where it is regripped by the gripping means G to begin the next production cycle. It is thus seen that a washer $w$ is produced during each cycle of operation rapidly and efficiently with no waste of metal. The machine for performing the method may be designed for high speed operation for many thousands of cycles without replacement of parts. The life of the elastic gripper tube 30 is in excess of a million cycles even where the tube is shrunk as much as .0025 inch in diameter during each cycle.

The extremely high pressure exerted by the gripping tube on the wire 31 reduces the diameter of the portion of the wire entering the die tube 34 whereby the internal diameter of said die tube and the corresponding internal diameter of the finished washer $w$ may be up to two or three thousandths of an inch less than the normal internal diameter of the gripper tube 30. The gripper tube 30, therefore, serves to shape the external surface of the wire 31 as well as to grip the wire whereby the wire is straightened and has an extremely smooth cylindrical outer surface of the proper size as it passes into the die tube 34. Although the sizes of the parts may vary considerably, and the forces employed to deform the metal and shape the article may also vary within wide limits, an example is given of the sizes which may be employed so as to facilitate an understanding of the invention.

*Example I*

The machine shown herein may, for example, be constructed to form a copper spark plug washer having an outside diameter of 0.625 inch, an inside diameter of 0.525 inch and an axial thickness of 0.050 inch. The die cavity 37 would, of course, have exactly the same dimensions when the upset pin and the punch annulus were located as shown in FIG. 8. When making such washer, the long wire 31 fed from the coil (not shown) to the feeding mechanism A has a length of more than 10 feet and a diameter of 0.527 to 0.529 inch and is fed about 0.035 inch beyond the bottom of the die cavity 37 to the position shown in FIG. 5. The gripper insert tube 30 has an internal diameter of 0.5265 to 0.5270 inch and an outside diameter of 1.0265 to 1.0275 inches and an axial length of 7.5 inches, the feed end of the tube being provided with a 30° by $\frac{1}{16}$ inch radial chamfer to ease wire entry. Such insert tube is formed of Resisto S.A.E. type S–5 steel manufactured by Uddeholm Company of America and is heat treated to provide a Rockwell surface hardness of $R_c 56$.

The segmented gripper G surrounding the gripper insert tube has an internal diameter of 1.0265 to 1.0275 inches and an outside diameter at the small end of 5.998 to 6.002 inches and an outside diameter at the larger end of 6.216 to 6.220 inches, the gripper being tapered 1° relative to the axis so as to provide a total taper of 2°. The length of the gripper G is 7.5 inches, and the segments 27 thereof are formed of a high quality through-hardening steel and are heat treated to provide a Rockwell surface hardness of $R_c 56$ to $R_c 58$, the spacing between the segments 27 being in the neighborhood of 0.05 inch.

The gripper case 25 is constructed of aluminum bronze and has an axial length of 6.437 inches, the outside diameter of said case being uniform and approximately 15 inches. The inside diameter of the case at one end is 5.9995 to 6.0005 inches and at the opposite end is 6.2175 to 6.2185 inches so as to provide the same taper as the taper of the gripper G.

The axial force required to move the gripper case 25 through its full travel of 0.5 inch would be about 30 tons which would result in the application of a radial pressure of about 4000 pounds per square inch between the gripper case 25 and the gripper G. The radial wedge action exerted on the gripper segments 27 transmits squeezing force to the gripper insert tube 30 and the internal diameter of said tube is shrunk approximately 0.0025 inch, the wire 31 within said tube also being shrunk. The die tube 34 has an internal diameter equal to the desired internal diameter of the washer $w$ which is 0.525 inch and the same as the external diameter of the upset pin 73.

In making a washer of this particular size using parts of the size indicated above, the axial force employed during the upsetting operation as shown in FIG. 6 is about 14 tons, the axial force applied during the coining operation shown in FIG. 7 is about 6 tons, and the axial force employed during the piercing operation shown in FIG. 8 is about 1.75 tons, but it will be understood that these forces will vary considerably depending on the exact sizes of the parts and the hardness of the wire 31. These forces are calculated for deforming a wire 31 made of soft electrolytic copper, S.A.E. 71 having a maximum Rockwell hardness of "F" 65.

The material used in the process of the present invention may be any ductile metal capable of being deformed without substantial heating including soft iron or alloys containing iron but the material is preferably one which is capable of being deformed at room temperature (i.e., 60° to 80° F.). The invention is particularly applicable to copper alloys containing a major portion of copper and various other metals known in the art as soft ductile metals. The wires employed in the present invention are usually made of copper, brass, bronze or similar soft metals, but it will be apparent that harder materials may be employed particularly if they are heated somewhat to facilitate deformation.

The material used to form washers or other articles according to this invention is usually in the form of a wire or rod of circular cross section. The diameter of the wire or rod will depend upon the size of the article being formed and may be very small or may be 3 inches or more, but the coiled wires usually have a substantially uniform diameter of less than 1 inch and usually have a length in excess of 10 feet. A machine of the general type shown in the drawings would usually be used with rods or coiled wires having a diameter of about 0.2 to 1 inch and a length of at least 10 feet.

The wire which is employed in the method of this invention need not be provided with an extremely accurate size since the process of this invention improves the surface characteristics of the wire before it is fed to the die. The wire may have a circular cross section which varies substantially in diameter throughout its length, but the external surface of the wire should be substantially smooth and free of cracks or other substantial defects. Any minor defects in the circumference of the wire as it enters the die will appear as a fracture in the external surface of the washer being formed in the die.

The method of this invention is particularly desirable for forming metal washers. The size of such washers may vary considerably but the axial length of the washer usually is about one-half to two times the radial thickness of the washer and such radial thickness is usually less than one-fourth and preferably less than one-fifth the internal diameter of the washer.

The cylindrical gripper tube employed in the method of this invention, such as the tube 30 shown in FIGS. 1 to 4, must have a substantial axial length to provide sufficient gripping force and must have substantial radial thickness in order to maintain its shape for thousands of cycles, but the size of the tube will vary considerably depending on the type of metal used to form the tube and the type of forming operation performed at the die. The tube preferably has polished internal and external cylindrical surfaces and is circumferentially continuous and free of perforations or surface defects. The gripper tube has an axial length more than five and preferably at least ten times its average internal diameter. The radial thickness of the tube is uniform and is preferably less than one-third the external diameter of the tube. Where the tube is made of a hard tool steel of high elasticity, the radial thickness may be about 0.4 to 0.6 times the average internal diameter of the tube.

The gripper tube may be formed of a hard tool steel of high elasticity or similar hard elastic metal capable of permanently reducing the diameter of a wire repeatedly without being permanently deformed. The gripper tube is usually heat treated to provide the necessary hardness which may, for example, be a Rockwell hardness of $R_c50$ to $R_c60$. Various tool steels may be employed to form the gripper tube. Excellent results are obtained using a tool steel having an elasticity within ten percent of that of Resisto S.A.E. type S–5 steel as employed in Example I, but advantages of the invention may be obtained using different material.

The desirability of a tool steel or other hard metal for use in this invention may be determined by forming a cylindrical tube of such material having a predetermined size (i.e., having a radial thickness that is one-fourth of its external diameter and having an axial length fifteen times its internal diameter). If such tube may be contracted radially at a temperature of 70° Fahrenheit from one-third to one percent without exceeding its elastic limit and may be contracted such amount and allowed to expand to its original size repeatedly for thousands of cycles without failure, it may be employed in the method of this invention. The tube should preferably withstand more than 500,000 cycles without failure and without material change in dimensions, but it will be apparent that some of the advantages of this invention can be obtained using materials of lesser quality.

The gripper tube employed in the present invention should be capable of being shrunk radially at least one-third of one percent repeatedly without exceeding its elastic limit or damaging the tube, but this amount will vary somewhat with different materials.

The gripper tube is preferably provided with a highly accurate, smooth, cylindrical, internal surface for engaging the wire to improve the surface characteristics of the wire. The normal internal diameter of such internal surface preferably varies no more than one-tenth of one percent along a substantial length of the tube and preferably along substantially the entire length of the tube except where the tube is enlarged to facilitate entry of the wire. Such accuracy is preferably maintained for an axial distance at least five times the internal diameter of the tube and usually at least ten times such internal diameter. Such accurate cylindrical surface is provided where the tube has its smallest diameter so that the wire leaving the tube and entering the die also has an accurate surface.

The wire fed to the gripper tube has an external surface which is much less accurate than the internal surface of the gripper tube. The external diameter of the wire entering the gripper tube preferably varies no more than one-half of one percent, and the apparatus shown can handle any wire having a diameter within that range whether the diameter is accurate or not if the wire has a substantially smooth external surface free of defects.

The maximum diameter of the wire is preferably such as to permit a forced feeding of the wire through the gripper tube. The tube may be enlarged slightly or provided with a chamfer or the like to facilitate entry of the wire and to permit a forced feeding. Such a forced feed may be preferred. The maximum external diameter of the wire is preferably one-tenth to four-tenths of one percent greater than the minimum internal diameter of the gripper tube, but satisfactory results may be obtained when the maximum wire diameter is up to about one-tenth percent less than the minimum diameter of the tube. The wire must have sufficient size so as to be properly gripped by the gripper tube to withstand the high axial forces during the upsetting operation but must not be so great as to prevent feeding of the wire into the gripper tube.

When radial pressure is applied to the tube to grip the wire, there is a substantial reduction in the diameter of the gripper tube throughout its entire length. The amount of radial contraction is sufficient to cause a permanent reduction in the external diameter of the wire but is not sufficient to exceed the elastic limit of the material forming the gripper tube. The amount of radial contraction of the gripper tube is preferably at least one-third percent and usually is no more than three-fourths percent of the normal diameter. The amount of such contraction is such that the tube may be expanded and contracted repeatedly for several thousand cycles without damaging the tube.

The amount of radial pressure applied by the gripper means to the tube can vary considerably depending on the size and shape of the tube and the type of material employed. Such radial pressure is at least 10,000 pounds per square inch when forming washers by axial pressure, as for example, in the machine of FIGS. 1 to 9, and may be 20,000 or 30,000 pounds per square inch or more. Such pressure is applied along the major portion of the length of the tube and preferably along the entire length of the tube so as to shrink the entire tube and to cause the tube to grip the wire substantially throughout its length.

The amount of radial contraction is sufficient to provide the proper grip on the wire and the necessary resistance to axial movement even if the wire is made of dead soft copper provided that the external surface of the wire is clean and free of grease or other lubricant. The external surface of the wire is permanently deformed due to the radial contraction of the gripping tube so as to improve the surface characteristics of the wire which may not have a surface finish as accurate as that of the gripping tube. This effects straightening of the wire to provide it with an accurate external cylindrical surface. The apparatus is, therefore, useful for straightening coiled wire. The total amount of reduction of the external diameter of the wire as it travels from one end of the gripper tube to the other is at least one-fifth of one percent so as to improve the surface characteristics of the wire and is preferably about one-fourth to three-fourths of one percent when the wire must be gripped to withstand very high axial forces, but it will be understood that such reduction may be much greater (i.e., three to five percent) when the inlet end of the gripper tube is enlarged, particularly when the metal of the wire is very soft. Because of the short length of the feed, the wire is continuously squeezed down to size.

The amount of permanent reduction in the diameter of the wire is preferably such as to provide a gripping force on the wire sufficient to withstand an axial force of about 100,000 to 400,000 pounds per square inch by the upset pin when performing the method performed by apparatus of the type shown herein. It is preferable to provide an adequate factor of safety to compensate for differences in the coefficient of friction. The axial force actually applied to the copper wire by the upset pin 73 in an apparatus of the type shown herein would be about 100,000 to 160,000 pounds per square inch, but the gripper tube should be able to withstand much higher axial forces, it will be apparent, however, that the axial forces will vary considerably depending on the softness of the wire and the type of forming operation being performed at the die.

The portion of the wire leaving the gripper tube and entering the internal cylindrical passage of the die tube or the die must be sufficiently low to permit feeding of the material into the die and sufficient to fill the die opening. The die passage of the die, or the die tube, is preferably a polished cylindrical surface which is axially elongated and coaxial with the gripper tube. The internal diameter of such passage is less than the normal internal diameter of the gripper tube and preferably varies no more than one-tenth percent throughout the length of the die tube, but it will be understood that such passage may be enlarged at the inlet end to facilitate entrance of the wire. The minimum diameter of such internal cylindrical die passage is preferably within one-tenth percent of the average diameter of the portion of the wire entering such passage and is preferably one-fifth to one-half percent less than the minimum internal diameter of the gripper tube in the normal unstressed condition.

Unless otherwise indicated, the dimensions described herein are the dimensions of the parts in the machine when the gripper tube is released and in its unstressed condition before the wire is fed to the gripper tube, and the changes in dimensions are those which obtain when the machine is operating in a normal manner to produce washers or other articles.

The amount of radial pressure applied to the gripper tube is preferably such that the internal diameter of the tube gripping the wire is within about one-tenth percent of the minimum diameter of the die tube or die passage so that the wire leaving the gripper tube has the proper size when it enters the die tube. The amount of such contraction will depend, of course, on the amount of gripping force required to withstand the axial forces on the wire during the forming operations. Such contraction must be sufficient to grip the wire and to provide an adequate factor of safety with respect to the resistance to axial movement.

It is thus seen that the gripper tube of the present invention provides an accurate surface on the wire entering the die while at the same time providing the extreme resistance to axial movement necessary to permit the upsetting operation employed for forming washers or other articles by relative axial movement between a punch assembly and a die assembly. Such a gripper tube may have a life of several million cycles and permits extremely high speed manufacture of small high quality articles such as washers without scrap loss.

The preferred method of the invention is to advance the wire or rod through the gripper tube in increments substantially less than the internal diameter of the gripper tube so that the wire is squeezed and released many times as it moves from the entrance of the gripper tube to the die. With such a method it is possible to employ a gripper tube having an accurate internal surface which is tapered very slightly and whose taper is accurate to within one-tenth percent, but it is preferable to provide a tube with a cylindrical surface to reduce the cost of manufacture of the tube and to provide a better grip on the wire. In the apparatus shown herein the feeding means A advances the wire during each cycle an amount less than the axial diminision of the finished washer w and sufficient to provide the volume of metal required to fill the die cavity 37.

The apparatus shown in FIGS. 1–4 is highly advantageous since it is relatively simple and is capable of producing washers at a very high rate of speed without scrap loss. Such apparatus operates efficiently and may be serviced readily. The gripping means thereof holds the wire properly without damaging the surface thereof and, in fact, improves the wire surface so as to improve the quality of the article formed at the die. Although the forces acting on material are extremely high, the construction is relatively simple as best shown in FIG. 3.

It will be noted that the axial forces applied during the various forming operations are taken up by the hardened steel back-up plate 42 and that the forces acting on the die insert block 35 are taken up by the segments 27 which engage the die block at one end and the back-up plate at the opposite end. An important feature of the invention is the loose mounting of the die insert block 35 which frees the segments 27 for radial movement when the gripper is released so that the segments do not freeze or lock against the die insert block. If desired, one or more set screws 136 may be provided on the plate 36 to hold the die insert block 35 in place and to assist in resisting any axial outward forces against such block as the wire 31 is fed through the die tube 34. The die tube is preferably rigidly mounted in the die insert block in any suitable manner so as to move in unison with such block. The head of each screw 136 projects radially inwardly a fraction of an inch from the plate 36 to limit axial sliding movement of the insert block 35 in the plate 36 toward the punch assembly. When the machine performs the coining step illustrated in FIG. 7, the insert block 35 is held against the gripper segments and there is a radial clearance of more than .001 inch between the block 35 and the head of the screw 136.

The recess 38 in the plate 36 extends radially a small fraction of an inch (i.e., ½ inch or so) beyond the external surface of the segments 27 to aid in centering the gripper assembly ahead of the die. This recess also assists in preventing locking of the segments against the back-up plate 42.

The process of the present invention is illustrated with a machine for forming spark plug gasket washers, but it will be apparent that different shaped punches and dies may also be employed and that forming operations may be performed which involve some radial forces as well as axial forces.

It will be understood that advantages of this invention may be obtained using dimensions varying somewhat from those mentioned herein and using different metal alloys. It will also be apparent that the method may be performed by apparatus quite different from that shown schematically in the drawings.

The above description is by way of illustration rather than limitation and it will be understood that variations and modifications of the specific methods and devices disclosed herein may be made without departing from the spirit of the invention.

Having described my invention, I claim:

1. Apparatus for forming articles from a coiled ductile metal wire of circular cross section comprising means for periodically advancing the wire in increments less than the diameter of the wire, a circumferentially continuous cylindrical tube having a smooth cylindrical internal surface of a normal diameter not substantially greater than that of the wire and a length at least five times its internal diameter, said tube being formed of a hard steel of high elasticity, and means for periodically applying radial pressure to said tube along the length thereof to shrink substantially the entire tube at least one-third percent and within the elastic limit of the material forming said tube to grip the wire, the amount of pressure imposed by the tube on the wire being sufficient to cause a permanent reduction in the external diameter of the wire.

2. Apparatus as defined in claim 1 wherein the means for applying radial pressure to said tube includes a series of closely circumferentially spaced segments having an axial length not materially less than the length of said tube and having internal cylindrical surfaces of substantially the same radius as the external surface of said tube in the normal unstressed condition.

3. In a method of forming articles from ductile metal wires by periodically applying axial pressure to the wire to cause radial outward flow of the metal which method requires a very smooth external wire surface to avoid cracks and other defects in the article, the steps of periodically advancing a wire in increments through a circumferentially continuous cylindrical tube of a hard elastic metal having a length of at least ten times its internal diameter and a smooth internal cylindrical surface, periodically applying radial pressure to said tube along the length thereof while the feeding of the wire is interrupted to shrink the entire tube within the elastic limit of the material forming said tube to grip the wire and to cause a permanent reduction in the external diameter of the wire, and forming an article by applying axial pressure to the portion of the wire discharged from said tube while the wire is gripped by said tube.

4. A method of cold forming articles comprising the steps of periodically feeding a wire of circular cross section in increments less than the diameter of the wire through a circumferentially continuous axially elongated cylindrical gripper tube of hard elastic metal to a hard metal die having a die opening with an internal diameter slightly less than the normal internal diameter of said tube, applying radial pressure to the exterior of said tube to shrink the tube and the wire therein to grip the wire and permanently deform the wire without exceeding the elastic limit of the tube material, applying an axial force to the end of the wire projecting through the die opening while the wire is so gripped to cause radial outward flow of the metal of the wire to form a radially enlarged head, allowing the tube to expand to its normal size, and separating said head from said wire.

5. A method as defined in claim 4 wherein said axial force is applied to the end of the wire projecting through the die opening by an externally cylindrical upset pin having an external diameter substantially equal to the internal diameter of said die opening, and said head is separated from said wire by moving said pin axially into said die opening to shear said head from said wire.

6. A method of improving the surface characteristics of a long ductile metal wire of circular cross-section fed from a coil and having an external surface which varies in diameter up to about one-half percent comprising the steps of advancing the wire to an axially elongated circumferentially continuous cylindrical tube having a substantially uniform radial thickness no more than one-third its external diameter and a smooth axially elongated internal cylindrical surface which varies in diameter no more than about one-tenth percent throughout a substantial portion of its length, the normal diameter of the cylindrical surface of said last-named portion being no greater than the minimum diameter of the wire fed thereto, periodically feeding the wire through said tube in increments less than the diameter of the wire to an internally cylindrical die having an internal diameter about one-fifth to about one-half percent less than the average normal diameter of said last-named cylindrical surface, and intermittently applying a high radial pressure to the tube while terminating such feeding to reduce the diameter of the wire to within about one-tenth percent of the internal diameter of said die and to provide the wire with a smooth cylindrical outer surface, said radial pressure shrinking said tube within the elastic limit of the material forming said tube.

7. A method comprising forming a coil from a long soft ductile wire of circular cross section having a diameter which varies up to about one-half percent, periodically feeding the wire from the coil in increments less than the diameter of the wire through a circumferentially continuous cylindrical hard elastic metal tube of uniform thickness having a smooth axially elongated internal cylindrical surface with a normal diameter no greater than the external diameter of the wire which varies no more than about one-tenth percent for an axial distance greater than five times its internal diameter, periodically interrupting the feed and applying a radial pressure to the exterior of the tube to shrink the same substantially uniformly throughout its length at least about one-third percent without exceeding its elastic limit, whereby the wire is straightened and provided with a smooth accurate outer surface, and directing the wire from said tube to an internally cylindrical die member having an internal cylindrical surface with a minimum diameter within about one-tenth percent of the diameter of the portion of the wire leaving said tube.

8. A method as defined in claim 3 wherein the normal internal diameter of said tube is no more than about one-tenth percent greater than the normal external diameter of said wire and sufficient to receive said wire and said internal diameter is reduced about one-third to three-fourths percent by the radial pressure on said tube.

9. A method as defined in claim 3 wherein said wire contains a major portion of copper and said tube consists of a hard steel of high elasticity.

10. A method of cold forming washers or the like comprising in seriatim the steps of periodically feeding a wire of circular cross section in increments less than the diameter of the wire through a circumferentially continuous axially elongated cylindrical gripper tube of hard elastic metal having an internal diameter not substantially less than the external diameter of the wire and through an internally cylindrical die member to a radially enlarged die cavity, applying radial pressure to the external surface of the tube to shrink the same and to grip the wire without exceeding the elastic limit of the tube, applying an axial force to the end of the wire sufficient to cause radial outward flow of the metal of the wire to form an annular head in said die cavity engaging the bottom of said die cavity at the marginal end edge of the internal cylindrical surface of the die member, cold forming said head by pressing the same axially against the bottom of said die cavity, allowing said tube to expand to its original diameter to release said wire, and thereafter shearing said head from said wire by axial pressure against the end portion of said wire that is aligned with the internal cylindrical surface of the die member.

11. Apparatus for gripping and forming a ductile metal wire fed from a coil comprising a hard elastic cylindrical circumferentially continuous gripper tube of uniform radial thickness for receiving the wire from said coil, said tube having a length at least ten times its internal diameter and a radial thickness no greater than one-third its external diameter, the material forming said tube having an elasticity such that an elongated cylindrical tube of such material with a radial thickness about one-fourth its external diameter may be contacted radially at a temperature of 70° Fahrenheit about one-third to one percent without exceeding its elastic limit and may be contracted such amount and allowed to expand repeatedly for thousands of cycles without failure, means for periodically feeding the wire part way through the gripper tube, and means for periodically applying an external pressure to the gripper tube throughout more than the major portion of its length to reduce the diameter thereof at least one-third percent throughout its length while he feed is interrupted.

12. Apparatus for forming articles from a ductile metal wire comprising a cylindrical gripper tube having a uniform radial thickness and a length at least five times its internal diameter, means for periodically feeding wire through said tube, collet-type gripping means for applying an external radial pressure to said tube to shrink the same at least about one-third percent within the elastic limits of said tube and to grip said wire when the feed thereof is interrupted, a die having an opening with a normal internal diameter slightly less than that of said tube for receiving the wire fed through said tube, a punch for deforming the metal of said wire in said die, and means for actuating the punch in timed relation to operation of said feeding means and said gripping means to cause the punch to engage the end of the wire while the wire is gripped by said tube.

13. Apparatus as defined in claim 12 wherein solvent wiper means are provided to remove lubricant from the surface of the wire fed to said tube and to provide the wire in said tube with a dry clean surface having a high coefficient of friction.

14. Apparatus as defined in claim 12 wherein said gripping means comprises a series of segments nested together to provide a segmental gripper having an internal surface with a diameter corresponding to the external diameter of said tube and a length corresponding substantially to the length of said tube and a frusto-conical external surface with a total taper of less than five degrees, a gripper case having an internal generally frusto-conical surface with the same taper as said external surface and mounted for axial movement, and a housing surrounding said gripper case.

15. In an apparatus for forming metal washers, in combination, a cylindrical gripper tube having a uniform radial thickness and as axial length at least ten times its internal diameter, a segmental gripping means having a cylindrical internal surface of substantially the same radius of curvature as the internal cylindrical surface of said tube, said gripping means comprising a series of axially elongated radially movable segments of generally triangular cross section having flat parallel radial side faces and an external frusto-conical surface with a uniform taper, said segments having an axial length not substantially less than that of said tube, and a gripper case having a uniformly tapered frusto-conical internal surface that conforms to the external surface of said gripping means, said last-named surface being coaxial with said tube and having a uniform taper of about one-half to about two degrees relative to the central axis of said tube, means mounting said gripper case for axial movement, and means for moving said case axially relative to said segments to move the segments radially inwardly and apply a radial pressure to said gripper tube sufficient to reduce the internal diameter of said tube more than about one-third percent without exceeding the elastic limit of the tube material.

16. Apparatus for forming metal washers from a ductile metal comprising a cylindrical hard elastic circumferentially continuous steel gripper tube of uniform radial thickness having an internal diameter no greater than the external diameter of said wire and an axial length at least 10 times its internal diameter, means for applying pressure to said tube to reduce the internal diameter thereof at least about one-third percent without exceeding the elastic limit to grip the wire with sufficient force to withstand an axial force on said wire of at least 50,000 pounds per square inch without slipping, a die having an internally cylindrical axially elongated passage with a diameter no greater than that of said wire which terminates at a die cavity having a cross section corresponding to the desired cross section of the washer, said die having a sharp circular edge at the end of said passage, means for intermittently feeding said wire through said gripper tube and said die passage to said die cavity to locate the end portion of the wire within said cavity beyond the end of said cylindrical die passage; a punch assembly having a long externally cylindrical upset pin mounted in axial alignment with said die passage for axial movement into and out of engagement with the end of said wire, said pin having a diameter substantially equal to that of said die passage and having a projecting wire-engaging nose portion with a blunt conical surface of revolution which intersects the cylindrical external surface of said pin at a circular marginal edge, a punch annulus having an internal cylindrical surface with a diameter substantially equal to that of said upset pin and mounted for axial movement relative to said upset pin to cause the metal from said wire to conform to the shape of said die cavity, and means for moving the upset pin into said die cavity and for shearing the metal in said cavity from the remaining cylindrical portion of said wire to produce an annular washer, the circular marginal edges of said upset pin and said die passage being located in planes perpendicular to the axis of said die passage and being sufficiently sharp to effect a clean shearing action.

17. Apparatus for cold forming washers from a continuous wire of uniform diameter comprising a die having an internal cylindrical passage with a diameter no greater than that of said wire and an annular die cavity at the end of said passage and radially outwardly thereof, said die cavity having a bottom annular surface substantially perpendicular to and intersecting the internal cylindrical surface of said die passage to provide a sharp circular edge and having a generally cylindrical peripheral surface concentric to the die passage, a punch assembly comprising an externally cylindrical upset pin and an independently movable punch annulus, said upset pin being mounted in axial alignment with said die passage for movement axially toward and away from said die passage and having an external diameter substantially equal to the diameter of said die passage, said pin having a sharp marginal edge and a blunt generally conical nose projecting a short distance beyond said marginal edge, said punch annulus having an internal cylindrical surface surrounding and engaging said upset pin of a diameter substantially equal to the external diameter of said upset pin and having an annular sleeve portion which extends radially from said upset pin to said peripheral surface of the die cavity when located at said cavity, means for periodically feeding the wire through said passage to the die cavity, tube means for gripping the wire to prevent axial movement thereof when the feed is interrupted, and means for reciprocating said pin and said punch annulus in synchronism with the gripping and feeding means to force the metal of the wire radially outwardly into said die cavity by axial pressure on the upset pin while the wire is gripped by the tube means, to cold coin the material in the die cavity by axial pressure on the punch annulus to cause it to conform to the shape of the die cavity, and to shear the material in the die cavity from the wire by forcing the marginal edge of the upset pin axially beyond the circular edge at the bottom of said die cavity while the wire is released by the gripping means.

18. Gripping and feeding apparatus for handling a ductile metal wire or rod comprising a circumferentially continuous cylindrical gripping tube formed of a hard steel of high elasticity and having a smooth cylindrical internal surface which varies in diameter no more than about one-tenth percent for an axial distance at least ten times its diameter, said tube having a uniform radial thickness that is no greater than one-third the external diameter of the tube, segmental gripping means for applying radial pressure to the tube to shrink the entire tube at least about one-third percent without exceeding the elastic limit of the tube material, said gripping means including an axially movable internally tapered gripper case concentric to said tube and mounted for axial movement and a series of circumferentially closely spaced sector-shaped segments of a hard steel having a radial thickness greater than the diameter of said tube and an axial length at least nine-tenths the axial length of said tube, said segments having an uniformly tapered external surface of revolution coaxial with said tube and conforming to and engaging the internal tapered surface of said gripper case, whereby the segments are moved radially in response to axial movement of the gripper case, actuating means for periodically moving the gripper case axially to effect gripping and releasing of the wire by said tube, means for periodically feeding the wire through the tube in increments less than the internal diameter of the tube, and means for controlling the actuating means and the feeding means to cause feeding of the wire when the gripping means is released and to cause gripping of the wire when the feeding is interrupted.

19. Apparatus for forming washers from a wire of circular cross section comprising means for gripping the wire including an axially elongated cylindrical gripper tube of uniform radial thickness and a series of segments for engaging the external surface of the tube to shrink the same, an axially elongated cylindrical die tube at the exit end of said gripper tube having an internal diameter slightly less than the normal diameter of said gripper tube for receiving said wire, an externally cylindrical upset pin in axial alignment with said tubes and mounted for axial movement into and out of said die tube, said pin having an oblique frusto-conical nose portion for engaging the wire, an annular die insert surrounding said die tube and having an axial length greater than that of the die tube to provide a die cavity at the exit end of the die tube, said insert engaging the segments and being loosely mounted for slight axial movement to release the segments for radial movement, a stationary hardened steel backup plate engaging said segments and the inlet end of said gripper tube to resist axial forces applied to the gripper tube and the segments by said die tube and said insert, and means for moving the upset pin substantially to said die tube and for applying an axial force to said upset pin sufficient to cause radial outward flow of the metal of said wire into the die cavity surrounding the end of the pin and against said insert while the wire is held against axial movement by the gripping means and by said backup plate.

20. A method of cold forming annular metal articles having a predetermined shape corresponding to that of a die cavity without waste of metal comprising the steps of periodically feeding a wire of circular cross section in increments less than the diameter of the wire through a circumferentially continuous axially elongated cylindrical gripper tube of hard elastic metal having an internal diameter not substantially less than the external diameter of the wire to a radially enlarged die cavity, applying radial pressure to the external surface of the tube to shrink the same and to grip the wire without exceeding the elastic limit of the tube, applying an axial force to the end of the wire sufficient to cause radial outward flow of the metal of the wire to form an annular head in said die cavity, cold forming said head by applying axial pressure to cause said head to engage the bottom of the die cavity, allowing said tube to expand to its original diameter to release said wire, and thereafter shearing said head from said wire by axial pressure to provide an annular article.

References Cited in the file of this patent

UNITED STATES PATENTS

| | | |
|---|---|---|
| 376,224 | Babbitt | Jan. 10, 1888 |
| 2,943,729 | Dalrymple | July 5, 1960 |

FOREIGN PATENTS

| | | |
|---|---|---|
| 506,380 | Italy | Dec. 22, 1954 |